R. B. FAGEOL.
AUTOMOBILE BUMPER.
APPLICATION FILED MAR. 31, 1921.

1,427,275.

Patented Aug. 29, 1922.
2 SHEETS—SHEET 1.

Rollie B. Fageol, Inventor

By Frederick S. Duncan, Attorney

R. B. FAGEOL.
AUTOMOBILE BUMPER.
APPLICATION FILED MAR. 31, 1921.

1,427,275.

Patented Aug. 29, 1922
2 SHEETS—SHEET 2.

Rollie B. Fageol Inventor
By Frederick P. Duncan Attorney

UNITED STATES PATENT OFFICE.

ROLLIE B. FAGEOL, OF OAKLAND, CALIFORNIA.

AUTOMOBILE BUMPER.

1,427,275.  Specification of Letters Patent.  Patented Aug. 29, 1922.

Original application filed November 12, 1917, Serial No. 201,474. Divided and this application filed March 31, 1921. Serial No. 457,324.

*To all whom it may concern:*

Be it known that I, ROLLIE B. FAGEOL, a citizen of the United States, residing at Oakland, in the county of Alameda and State of California, have invented certain new and useful Improvements in Automobile Bumpers, of which the following is a full, clear, and complete description.

This application is a division of my pending application Serial No. 201474, filed November 12, 1917.

In general the present invention relates to improvements in means for protecting vehicles against damage resulting from collisions with moving or stationary objects, and is particularly directed to automobile bumpers.

An object of the present invention is to provide a device of the aforesaid character which may be cheaply manufactured and readily attached to a vehicle without altering the construction or detracting from the appearance thereof, and which when in place will effectively guard against injury the parts of the vehicle which it is designed to protect.

The invention is further directed to the provision of a bumper which will embody few parts, and which, by reason of its make-up and mode of application to a vehicle, will eliminate the rattling noise which usually results from the interconnected parts of any of the bumpers now known. For obvious reasons the elimination of this disagreeable feature is a decided advantage.

The invention further contemplates the provision of a bumper for motor vehicles and the like of such nature as to be particularly effective in deflecting the shocks from encountering obstacles in such a way as to minimize the danger either to the vehicle or to the object encountered.

A further object of the invention is the provision of a bumper which will yield in all directions, both forward and back, and laterally.

Another object of the invention consists in the provision of a bumper structure of such character that the bumper itself will not be destroyed or permanently distorted or injured by the shocks to which a bumper is frequently subjected, so that the bumper will not be quickly rendered useless or distorted into unsightly form.

A still further object of the invention is to provide a bumper which eliminates the likelihood of the ends of the bumper becoming entangled with an object interposed in the path of movement of the vehicle, this object being accomplished by having the bumper yieldable throughout, and having the end portions bent over upon themselves. The bent over portions of the bumper have another advantage in that should the bumper encounter an object and be forced backwardly into engagement with the tire, the latter will not be injured thereby, while at the same time the bumper bar will be reinforced and cushioned by the tire and will not be permanently distorted. A still further advantage of the flexible bent-over portions is that, in case an object is encountered, for instance, in backing out of a garage, the end of the bumper bar may not catch at all, by reason of the bent-over portion, but should it catch the bar will yield outwardly and allow the bumper to slip by, but by reason of its flexibility the bar will at once return to its original shape.

A further object of the invention is to provide a bumper structure which may be readily attached to cars of various types and sizes and having frames of various widths. And a still further object of the invention is to provide a bumper structure which will be strong and durable, efficient, attractive in appearance, and which shall tend to improve the appearance of the vehicle to which it is applied.

In the accompanying drawings, wherein an embodiment of the present invention has been illustrated.

Like characters of reference designate like parts throughout the drawings.

Figure 1:
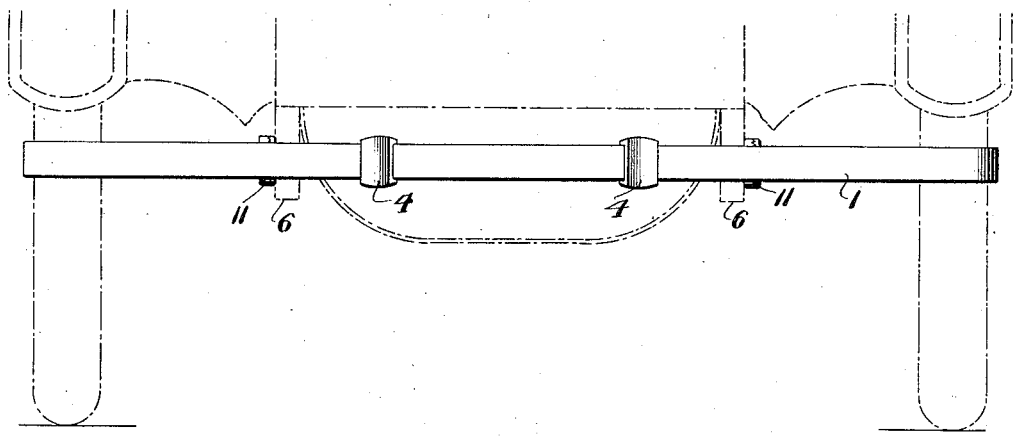
Figs. 1 and 2 show in elevation and plan respectively, the bumper in place upon a vehicle.
Figure 2:
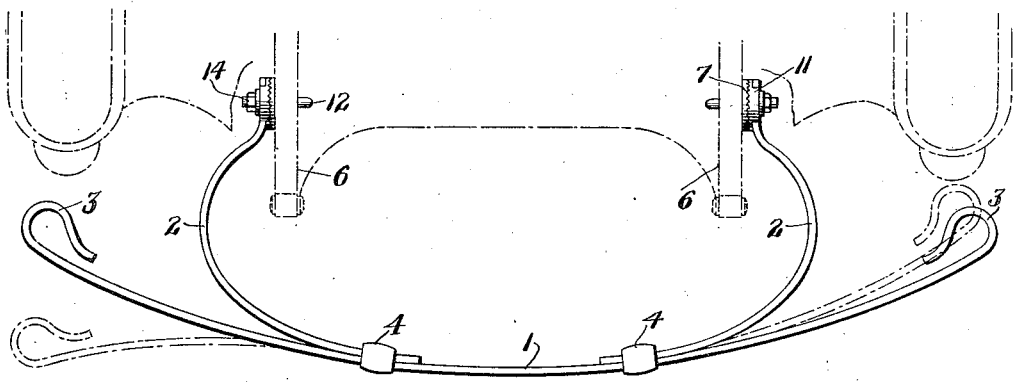

Referring now to the drawings in detail, 1 designates the bumper bar, and 2, 2 the supporting members therefor. Both bar and supporting members are made of yieldable material, such as spring metal, the bar 1 being preferably slightly bowed outwardly, and when in use, extending transversely of the vehicle, its ends projecting a slight distance beyond the sides of the body of the vehicle, or substantially in line with the tread of the wheels thereof. The end portions of the bar, designated 3, 3 are bent over upon themselves, preferably to form a "shepherd's crook."

The members 2, 2 and the bar 1 are adjustably clamped together by means of straps 4, 5 adapted to be slipped over the ends of the bar, set screws 5, 5 holding the straps in place and securely clamping the buffer members 1 and 2, 2, the inner ends of these screws preferably entering detents or depressions formed in the ends of the members 2, 2. This construction constitutes a very effective method for holding the supporting members to the buffer bar, and also permits of lateral adjustment of the bar; it also constitutes means whereby the supporting members may be adjusted to adapt the buffer to vehicles of various widths and shapes.

Figure 3:
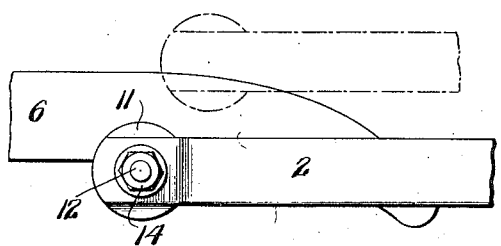
Fig. 3 is a side elevation of one of the supporting elements shown in Fig. 2.
Figure 4:
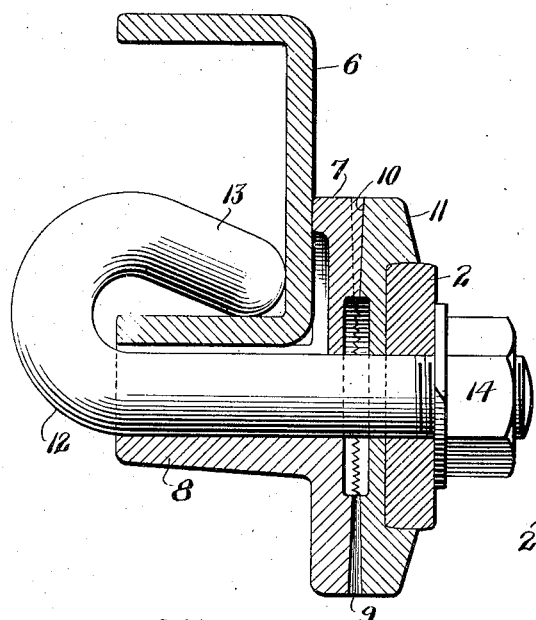
Fig. 4 is a section through the mechanism for attaching the bumper to a vehicle.
Figure 5:
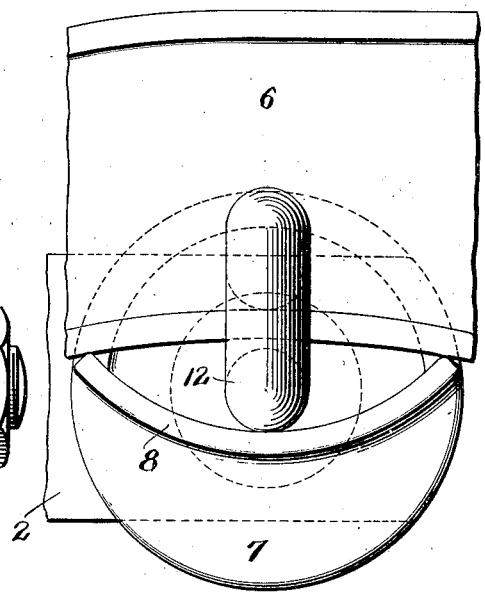
Fig. 5 is an elevation of the apparatus of Fig. 4.
Figure 7:
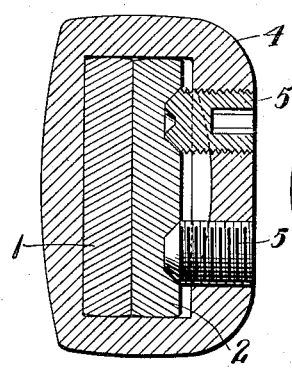
Fig. 7 is a section taken on the line 7—7 of Fig. 6 looking in the direction of the arrows.
Figure 8:
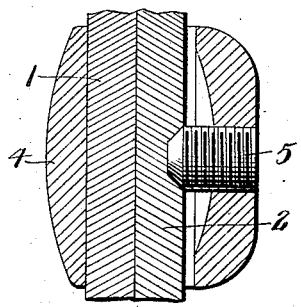
Fig. 8 is a section taken on the line 8—8 of Fig. 6.
Figure 6:
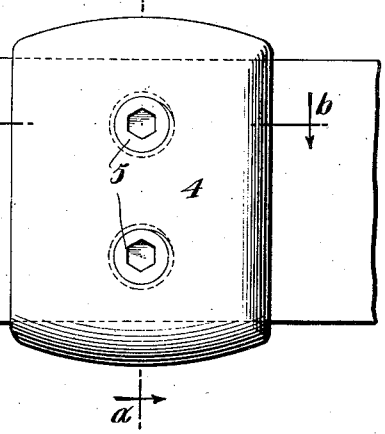
Fig. 6 is an enlarged elevational view of one of the members connecting the bumper bar to its supporting members.

The members 2, 2 which are preferably bowed or bent, substantially in the form illustrated, have their inner ends adjustably clamped to the frame 6 of the vehicle. One of these clamps is shown in Figs. 4 and 5, and as the clamp for the other member 2 is a duplicate thereof, a description of one will suffice. This clamp comprises a disc 7, having an arc shaped flange or projection 8 formed thereon, and shown in Fig. 4 as engaging the under side of the channel member 6. Teeth or indentations 9 are formed on the face of this disc, and are complementary to similar teeth 10 on the face of a disc 11, slotted on its opposite face to receive the end of the member 2. A hook bolt 12 passes through the end of the member 2 and through the discs 7 and 11, its hook portion, designated 13, engaging the inner or channel side of the member 6, so that when the nut 14 on the bolt is tightened up, the end of the member 2 will be securely held in place. It is obvious that by simply starting the nut 14, the disc 11 may be rotated about the bolt 12 so as to adjust the bumper vertically. It is apparent also that the construction of the clamping mechanism just described enables the bumper to be applied quickly and insures that it will always remain in adjusted position, and by reason of the flange 8 and hook bolt 12 will effectively withstand any reasonable pressure that may be put upon it. Another feature of this clamping mechanism is that the members 2 may be secured to the upper part of the member 6 if desired, as illustrated in broken lines in Fig. 3, by simply turning the disc 7 and bolt 12 upside down from the position shown in Fig. 4 for instance.

Inasmuch as the clamps for holding the supporting members to the buffer bar are readily adjustable, and likewise the clamps for securing the supporting members to the vehicle, the buffer is readily adjustable both vertically and laterally to conform to the shape and size of any vehicle to which it may be attached. By reason of the shape of the members 2 and the bar 1, the buffer is extremely well adapted to yield under all strains to which it may be subjected, without being broken or permanently damaged. It is apparent also that the members 2, 2 will yield readily to both lateral and longitudinal strains, and by thus compensating for lateral strains there is no danger of the connection between the bumper and the vehicle body being broken or damaged by a side blow. Furthermore by reason of the bowed form of both bumper bar and supporting members, the strength of the bumper is increased under head-on shock or blow, without however, sacrificing the yielding or resilient characteristics necessary to apparatus of this nature. The end portions of the bumper are of course particularly likely to be subjected to glancing blows, but as they are adapted to yield to a considerable extent they will at once return to their original shape without permanent injury to the buffer. The bent over portions of the buffer bar have been found to be highly effective in eliminating entangling of the buffer in obstructing objects in the path of movement of the vehicle, and will at the same time cause less damage to the object struck. The edges of these bent over portions are rounded off slightly or the bent over portions may be made of oval stock so that should they ever be bent back far enough to engage the tire of the vehicle they would not cut or injure the same.

It will be seen that the bumper described includes an impact receiving member forced throughout its length of yielding material, of such a nature that the bumper will always return to its original shape after impact. This impact receiving member is reinforced by the yieldable supporting members which also assist in restoring the bumper to its original shape. The use of spring material in the construction of the bumper is of particular importance in securing durability and ability to withstand impacts without permanent distortion. The bumper also includes the bent over portions at each end, which together with the yielding characteristic of the bumper will allow obstructing objects to be passed without danger of injury either to the vehicle or the bumper.

It is to be understood that I do not limit myself to the exact construction of the various yielding members constituting the present invention, nor to the precise arrangements of parts illustrated, as others skilled in this art might make various changes therein, without, however, departing from the spirit and scope of my invention.

What I claim as new, and desire to secure by Letters Patent of the United States is:

1. A vehicle bumper, comprising an impact member adapted to extend across the frame of the vehicle and characterized by having its terminal end portions looped rearwardly and means independent of said looped portions for attaching the bumper to the vehicle.

2. A vehicle bumper comprising a resilient impact member adapted to extend across the frame of the vehicle and characterized by having its terminal end portions looped rearwardly with the ends of said members lying in spaced relation to the rear wall thereof to provide spring loops, and means independent of said looped portions for attaching the bumper to the vehicle.

3. A vehicle bumper comprising an impact member adapted to extend across the frame of the vehicle and characterized by having its terminal end portions looped rearwardly and resilient means independent of said looped portions for attaching the bumper to the vehicle.

4. A vehicle bumper, comprising an impact member adapted to extend across the frame of the vehicle, and characterized by having its terminal end portions looped rearwardly and means secured to said impact member intermediate the looped portions for supporting said member on the vehicle.

5. A vehicle bumper, comprising an impact member adapted to extend across the frame of the vehicle and characterized by having its terminal end portions looped rearwardly and resilient means adjustably secured to said member for attaching the bumper to the vehicle.

6. A vehicle bumper, comprising an impact member bowed outwardly relatively to the vehicle and adapted to extend across the frame thereof, and characterized by having its end portions bent over to form open loops, and means secured to the said member intermediate the bent over portions for attaching the bumper to the vehicle.

7. A vehicle bumper, comprising an impact member of resilient material and characterized by having its terminal ends looped rearwardly and members of resilient material secured to said bumper intermediate said looped portions for attaching the bumper to the vehicle.

8. A vehicle bumper, comprising a flexible impact member characterized by having its end portions bent over, and means secured to said member at points removed from the free ends thereof for attaching the latter to the vehicle, said means comprising members of resilient material bowed outwardly from each other.

9. A vehicle bumper, comprising an impact member of resilient material characterized by being bowed outwardly and having its end portions bent over, and means secured to said member intermediate its ends for attaching the latter to the vehicle, said means comprising members of resilient material bowed outwardly from each other.

10. A vehicle bumper, comprising an impact member for extension across the frame of the vehicle and terminating in rearwardly disposed looped portions at each end, attaching means secured to said member intermediate the ends thereof, said member being characterized by being yieldable from the point of attachment of said means thereto and including the looped ends.

11. A securing attachment for adjustably uniting a spring-supporting member to an impact member of a vehicle bumper, comprising a hollow one-piece member adapted to receive the impact member and the end of the spring supporting member, and clamping screws passing through the wall of said hollow member and engaging the supporting member to clamp the same to the impact member.

12. A securing attachment for adjustably uniting a spring supporting member of a vehicle bumper to the vehicle, comprising a member having a flange integral therewith adapted to engage the frame of the vehicle, a second member provided with means to receive the end of the supporting member, and a bolt passing through the supporting member and the other members and engaging the vehicle frame to maintain the supporting member rigid with the frame.

13. A securing attachment for adjustably uniting a spring-supporting member of a vehicle bumper to the vehicle, comprising a member having a flange integral therewith and adapted to engage the frame of the vehicle, indentations on one face of said member, a second member having a face complementary to the indented face of the first-named member, said last-named member having means for the reception of the supporting member, and a bolt passing through the end of the supporting member and the other members and having a hooked portion engaging the frame of the vehicle to hold the supporting member in adjusted position.

14. A vehicle bumper, comprising a flexible impact member and means secured to said member for attaching the latter to the vehicle, said means comprising flexible members curved in a horizontal plane and having one end attached to the impact member at a point intermediate its ends, said impact member adapted when flexed rearwardly at its ends to ride on the bent portions of said attaching members, and the other end to the vehicle.

15. A vehicle bumper, comprising a flexible impact member of flat stock, and means secured to said member for attaching the latter to the vehicle, said means comprising flexible members curved in a horizontal plane and having one end attached to the impact member at a point intermediate its ends, and the other end to the vehicle, whereby the projecting ends of said impact member are capable of being either forwardly or rearwardly flexed.

16. A vehicle bumper, comprising a flexible impact member of flat stock, and means secured to said member for attaching the latter to the vehicle, said means comprising flexible members of flat stock curved in a horizontal plane and having one end attached to the impact member at a point intermediate its ends, and the other end to the vehicle.

17. A securing attachment for adjustably uniting the supporting arm of a vehicle bumper to a frame member of the vehicle, comprising a bearing member adapted to engage the frame member at two sides, a receiving member for the arm abutting the bearing member, the abutting faces of the bearing and receiving members being provided with ratchet teeth, and a retaining device extending through the receiving and bearing members and engageable with the frame member of the vehicle for clamping the parts in adjusted position.

18. A securing attachment for adjustably uniting a supporting arm of a vehicle bumper to a channel frame member of the vehicle, comprising a bearing member having a disc shaped portion engaging the vertical side of the frame member and provided with serrations on its exterior face, a flange portion integral with the disc portion to engage the horizontal web of the frame member, said flange portion being made concave and contacting with the frame member at two widely separated points, a receiving member for the supporting arm also disc shaped and having serrations on one face to cooperate with the serrations on the bearing member, and a retaining member extending through the receiving member and through the concave portion of the flange on the bearing member, said retaining member being engageable with the channel bar of the frame member and having means for clamping the parts in adjusted position.

ROLLIE B. FAGEOL.